Oct. 24, 1967 W. R. LAUPER 3,348,435
MULTI-AXIS MACHINE MISALIGNMENT COMPENSATOR
Filed Feb. 11, 1965 4 Sheets-Sheet 1

INVENTOR.
WARNER R. LAUPER
BY
Shenier & O'Connor
ATTORNEYS

Oct. 24, 1967 W. R. LAUPER 3,348,435
MULTI-AXIS MACHINE MISALIGNMENT COMPENSATOR
Filed Feb. 11, 1965 4 Sheets-Sheet 2

INVENTOR.
WARNER R LAUPER
BY Shenier & O'Connor
ATTORNEYS

United States Patent Office 3,348,435
Patented Oct. 24, 1967

3,348,435
MULTI-AXIS MACHINE MISALIGNMENT COMPENSATOR
Warner R. Lauper, San Pedro, Calif., assignor to Coleman Electronic Systems, Santa Ana, Calif., a corporation of California
Filed Feb. 11, 1965, Ser. No. 431,849
22 Claims. (Cl. 77—63)

ABSTRACT OF THE DISCLOSURE

A machine misalignment compensating system for a multiple axis machine in which a tool is adapted to be moved along ways aligned with the respective axes relative to a workpiece so mounted as to have a nominal predetermined alignment with the axes. A pivoted template associated with a respective axis operates a follower to control movement of the tool perpendicular to the axis with which the template is associated so as to compensate both for irregularity in the ways and deviation of the workpiece from its nominal alignment.

---

My invention relates to an error compensator for multiple axis machines and more particularly to apparatus for compensating errors which result from the misalignment of the machine ways or the workpiece or both.

Control systems have been developed for heavy multi-axis machines to program them automatically to perform a series or sequence of operations. For example, the machine can be programmed to bore a pattern of holes in a workpiece. The machine to which my invention is applicable will usually have three ways and three corresponding perpendicular axes which may be designated as horizontal axis X, horizontal axis Y, and vertical axis Z. Any two axes define a plane of the machine such as, for example, a horizontal X–Y plane, or a vertical Y–Z plane. Such machines are usually designed with a carriage which moves along the ways to a predetermined location on a workpiece that has been aligned with the machine axes. This predetermined location is established by reference to the machine ways. These machines are usually controlled by a feedback signal proportional to the position of the carriage along the ways. If the ways along an axis, the X axis for example, are worn the significant error in the final position of the carriage in the X–Y plane will be an error in its position along the Y axis. If the workpiece is misaligned with the X axis in the X–Y plane, the result is the same—a significant error in the Y position of the carriage. For accurate work, precise alignment of the machine ways, and precise alignment of the workpiece, has heretofore been essential but difficult.

When clamps are applied to hold a heavy workpiece in place, the workpiece will frequently be misaligned by a small amount with respect to the direction of carriage travel. There has been no convenient and simple device which insures proper alignment of the workpiece with reference to the machine axes. Present practice requires repeated measurements followed by adjustments with a mallet or the like to achieve the proper workpiece alignment.

To insure that the machine ways are true requires careful and costly construction. Structural members massive far in excess of those needed to carry the loads must be employed, since deflection of some machine supports such as horizontal beams under moving loads will produce an erroneous axis. Often even this additional expense and care do not give the required accuracy. Carefully built machines can and will become misaligned. For example, a shift in the foundation of the building in which the machine is installed may cause misalignment. Additionally, wear can cause warping or skewing of the machine ways, or both. To bring a machine that is out of alignment back into alignment requires reworking of the ways, which is a costly and time consuming procedure.

I have invented a device which permits a multi-axis machine whose ways are worn or out of line to perform a series of accurate operations on a workpiece whether it is aligned with respect to the machine axes or not.

One object of my invention is to provide apparatus to improve the accuracy of the operations performed by a multi-axis machine.

Another object of my invention is to simplify the positioning of a workpiece on a machine by compensating for the errors which would be introduced by any misalignment of the workpiece.

Still another object of my invention is to reduce the cost of multi-axis machines by providing an error compensator for misaligned or worn ways.

A further object of my invention is to provide apparatus which may be installed to compensate for misalignment of a machine which occurs after it has been in use.

An additional object of my invention is to provide apparatus which is relatively inexpensive, which does not alter the programmed operation of the machine with which it is used, and which will compensate for machine wear, machine misalignment and workpiece misalignment, or any of these.

Other and further objects of the invention will appear from the following description.

In general my invention contemplates the provision of angularly adjustable templates along the machine ways. A follower moved along the templates generates a signal which is a function of the deviations of the ways or the workpiece or both from the corresponding machine axis. This signal compensates for the error in the ways or for the error in workpiece alignment or for both by changing the position of the carriage from its programmed position along an axis which is perpendicular to the axis along which the template lies. This perpendicular axis is in the plane of the machine in which the misalignment of way or workpiece lies.

The template is placed parallel to the axis along which it lies and patterned to match any distortion in the corresponding way. If the workpiece is misaligned by making an angle with the machine axis, I adjust the template through a proportional angle. As the carriage moves along the way to its programmed location, the follower concomitantly moves along the template. Where the template has been patterned, or where it has been angularly adjusted, the follower moves perpendicularly to the machine axis. The perpendicular movement of the follower is a function of the deviations of the workpiece or the machine ways from the machine axis. The perpendicular component of movement of the follower applied to the programmed position of the carriage along the perpendicular axis compensates for the error in the ways or workpiece alignment.

In the accompanying drawings, which form part of my specification and which are to be read in conjunction therewith, and in which like reference characters are used to indicate like parts in the various views:

FIGURE 3 is a schematic side elevation of the machine shown in FIGURE 1;

Figure 1:
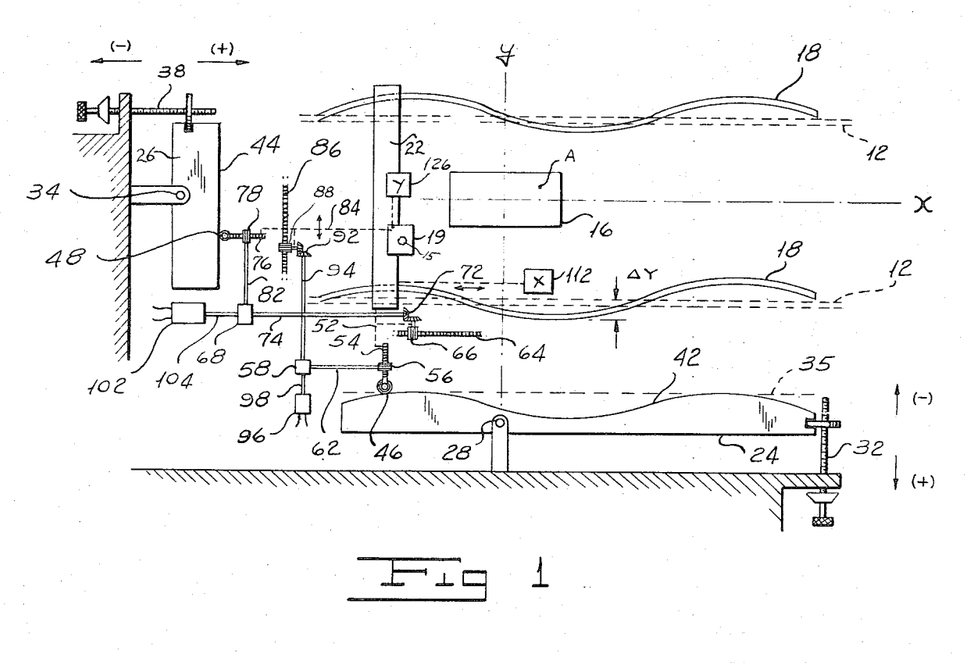
FIGURE 1 is a schematic plan view of a machine, showing an exaggerated distortion of ways, equipped with one embodiment of my error compensator.
Figure 2:
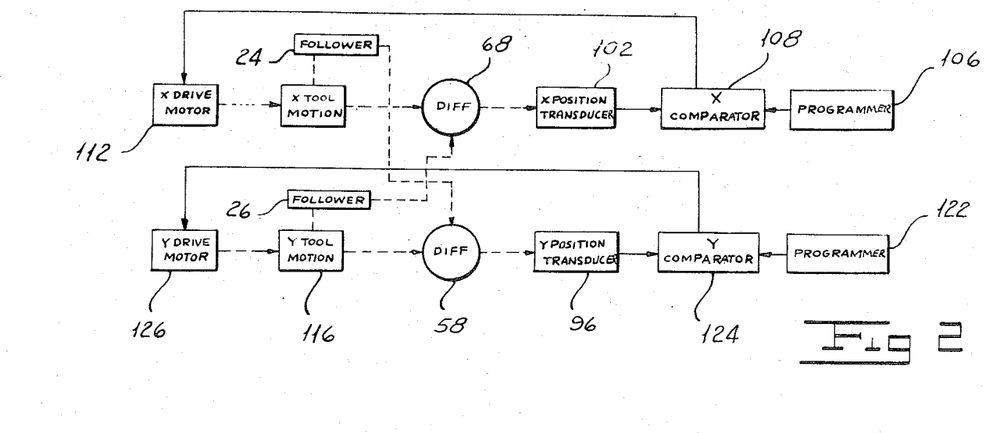
FIGURE 2 is a block diagram of a control system for the X–Y axis of the machine shown in FIGURE 1.

More particularly, referring now to the drawings, I have illustrated in FIGURES 1, 2 and 3 a worn, misaligned multiple axis machine tool. The machine axes are designated X, Y and Z. The carriage of the machine shown is designed to move in the X axis direction along ways parallel to the X axis, and to move in the Y axis direction on a cross member 22 parallel to the Y axis. If the machine ways are true, a tool 15 supported by a carriage 19 is positioned to bore a programmed series of accurately located holes in a workpiece 16 which is aligned with the machine axes.

In the designed operation of the machine the location of drill 15 relative to the workpiece is established with reference to the machine ways, as is common in the art. To illustrate how my novel apparatus can correct for misalignment and wear of the machine ways or skewing of the workpiece, or both, I have shown a set of machine ways 18 distorted.

Considering first the X–Y plane of the machine alone, I provide a template 24 parallel to the X-axis and a template 26 parallel to the Y axis to correct for the error in the ways 18 or a misaligned workpiece or both.

The template 24 is pivotally mounted on a pin 28 which is in a line passing through the origin of the machine reference axes. At one end of the template 24 I provide screw 32 for rotatably adjusting the template 24 about pin 28 to vary the angle the template makes with the X axis. The Y axis template 26 is similarly pivotally mounted on a pin 34 which is on a line passing through the origin of the machine reference axes. I provide a screw 38 at one end of template 26 for adjusting the angle the template 26 makes with the Y axis.

The ways 18 along the X axis are displaced in the X–Y plane of the machine from the designed locus shown by the dashed line 12. It will be understood while I have shown the way exaggeratedly distorted, the deviation of the way normally does not exceed a fraction of an inch. To compensate for these warped ways 18, I pattern the surface 42 of template 24 after the actual projection of the ways 18 in the X–Y plane. The proper shape for surface 42 can readily be established by making a series of measurements from a fixed reference line as the carriage 19 is moved along the ways 18.

In the machine illustrated in FIGURE 1 there is no misalignment or wear in the Y-axis ways or cross beam 22, so the surface 44 of template 26 is uncut and is parallel to the Y axis.

I provide followers 46 and 48 for the templates 24 and 26 respectively. A drive member indicated schematically at 52 moves the follower 46 along the template surface 42 as the cross member 22 moves back and forth along the X-axis. A rack 54 is mounted on follower 46, and a pinion or gear 56 engages the rack 54. Gear 56 is coupled to one input of a differential gear 58 by a shaft 62. To determine the position of the carriage 19 along the X axis of the machine I provide a rack 64 and a pinion or gear 66 which engages the rack 64. Member 52 causes the gear to move along the rack 64 as the carriage 19 moves in the X axis direction. Gear 66 is coupled to a differential gear 68 by bevelled gears 72 and shaft 74.

I provide similar parts along the Y axis. A rack 76 which engages a gear or pinion 78 carries follower 48. The output of gear 78 is coupled as a second input to the differential 68 by means of a shaft 82. The follower 48 is moved in the Y axis direction along the template surface 44 as the carriage 19 moves in the Y axis direction by a member indicated schematically by the reference numeral 84. To establish the position of carriage 19 along the Y axis I provide a rack 86 and a gear or pinion 88 which is moved along rack 86 by member 84. This gear 88 is coupled to the differential 58 by means of bevelled gears 92 and shaft 94.

Differential gear 58 is connected to a Y axis position transducer 96 by a shaft 98. The other differential gear 68 is connected to an X axis position transducer 102 by a shaft 104. The transducers 96 and 102 have an electrical signal output as a function of the position of the carriage 19 along the Y and X axes respectively. These transducers can conveniently comprise respective potentiometers which convert the rotation of shafts 98 and 104 to the required electrical signals.

FIGURE 2 shows a control system for the X and Y axes. The control system for the Z axis is similar to that shown on the X and Y axes. The control system illustrated is a conventional rebalance control system known to the art. It will be understood that my invention can be advantageously employed with any machine control system such as a digital servo control system, for example. The X axis control comprises an X axis position command programmer 106 whose output is connected to a comparator 108. The output of the comparator 108 controls the X axis drive motor 112 to drive the carriage 19 along the ways 18 and to produce the X axis motion indicated by the block 114. This motion of the carriage 19 along the ways 18 drives one side of differential gear 68 by means of rack 64 and pinion 66. The component of follower 48 movement which is perpendicular to the Y axis drives the other side of differential 68 by means of rack 76 and gear 78, and the output of this differential gear 68 drives the X axis position transducer 102. The output of transducer 102 is coupled to the comparator 108. When the outputs of transducer 102 and programmer 106 are equal, there is no output from comparator 108 and motor 112 stops.

The Y axis control system is similar to that just described for the X axis, and comprises a programmer 122 the output of which is coupled to a comparator 124. The output of comparator 124 drives the Y axis drive motor 126, which causes the Y axis motion of carriage 19 indicated by the block 116. This carriage motion along the beam 22 drives one side of differential gear 58 by means of rack 86 and gear 88. The component of the movement of follower 46 which is perpendicular to the X axis drives the other input side of differential gear 58 by means of rack 54 and gear 56. The output of differential gear 58 drives the Y axis transducer 96, and the output of the transducer 96 is coupled to the comparator 124. When the output of programmer 122 is balanced by the output of transducer 96 there is no output from comparator 124 and motor 126 stops.

In operation, assume that the machine tool is programmed to drill a hole at point A on workpiece 16, and that the workpiece is aligned with the machine axes. The X axis and the Y axis coordinates of point A are $x$ and $y$ respectively. The X axis programmer 106 has an output which is a function of the X axis coordinate of point A, $x$, and this output is coupled as an input to comparator 108. If the inputs to comparator 108 from programmer 106 and transducer 102 are different, an output from comparator 108 causes the X axis motor 112 to drive beam 22 along the ways 18 toward the X axis coordinate position of point A. Rack 64 causes gear 66 to rotate as the gear is carried along the X axis with carriage 19. The output of gear 66 is coupled to one input side of differential gear 68 whose output is coupled to transducer 102 that produces an electrical signal that is a function of the position of beam 22 and carriage 19 along the X axis.

As beam 22 and carriage 19 move along the X axis, follower 46 moves along template 24. The component of follower motion perpendicular to the X axis drives one input side of differential gear 58 by means of rack 54, gear 56 and shaft 62.

The Y axis programmer 122 has an output which is a function of the Y axis coordinate of point A, $y$, and this output is coupled as an input to comparator 124. If the inputs to comparator 124 from programmer 122 and transducer 96 are different, an output from the comparator causes motor 126 to drive carriage 19 along beam 22 toward the Y axis position of point A. The movement of carriage 19 along the Y axis causes gear 88 to rotate on rack 86. The output of gear 88 is coupled to the other input side of differential gear 58. Upward movement (in FIGURE 1) of carriage 19 causes additive rotation of shaft 94 and downward movement has the opposite effect. The output of differential gear 58 is coupled to transducer 96 that produces an electrical signal that is a function of the position of carriage 19 along the Y axis.

As carriage 19 moves along the Y axis, follower 48 moves along template 26. The component follower motion perpendicular to the Y axis drives the other input side of differential gear 68 by means of rack 76, gear 78, and shaft 82.

Carriage 19 will be correctly positioned along the X axis without compensation since there is no misalignment of beam 22 in the X–Y plane. However, when the output from transducer 96 equals the output of programmer 122 the carriage 19 will be positioned below the point A by the amount indicated as $\Delta Y$ in FIGURE 1 because of the displaced ways 18, unless the ways 18 are compensated for. Template 24, with its surface patterned after ways 18, provides the required compensation. When the carriage 19 is properly positioned along X axis, follower 46 has moved perpendicularly to the X axis by the amount $\Delta Y$. Downward movement of follower 46 causes subtractive rotation of shaft 62, and upward movement causes the opposite or additive rotation. The number of revolutions of the output shaft 98 for any given position of carriage 19 along the Y axis is thus decreased by an amount proportional to its downward movement and increased an amount proportional to its upward movement. Since shaft 98 drives transducer 96, the transducer output will be correspondingly increased or decreased at any Y axis position of carriage 19. In the example of FIGURE 1 follower 46 moves downwardly and the output of transducer 96 is decreased a corresponding amount for any Y axis position of carriage 19. When the carriage is at the programmed location along the beam 22, the inputs to comparator 124 will not be equal, and an output from the comparator will operate motor 126 until the motor has driven the carriage through an additional distance $\Delta Y$. As the carriage 19 moves upward through the distance $\Delta Y$ shaft 94 drives differential 58 an amount proportional to $\Delta Y$. The differential gear's output shaft 98 in turn drives transducer 96. Thus when the carriage 19 has moved through the distance $\Delta Y$ and is correctly positioned along the Y axis, the inputs to the comparator 124 balance and motor 126 stops.

Along the X axis differential gear 68 subtracts the inputs from shafts 74 and 82. Movement of gear 66 from left to right causes additive rotation of shaft 94 and gear movement from right to left causes the opposite or subtractive rotation. Movement of follower 48 from left to right causes subtractive rotation of shaft 82, and movement of the follower from right to left results in additive rotation of the shaft 82. Since surface 44 of template 26 is parallel to the Y axis, there is no perpendicular movement of follower 48, and the output of differential equals the input from shaft 74. The carriage will, therefore, be correctly located along the X axis at its programmed position.

Figure 4:
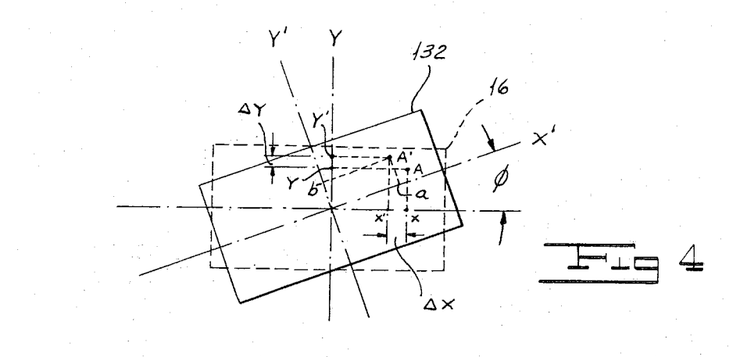
FIGURE 4 is a diagram showing the errors caused by workpiece misalignment or skew.

FIGURE 4 illustrates the errors which can be caused by workpiece misalignment. In FIGURE 4 the X–Y axes represent the machine axes, and the axes of the aligned workpiece 16 coincide with the machine axes. Reference numeral 132 refers to a workpiece that is identical to workpiece 16 but is misaligned through an angle $\phi$. The axes of workpiece 132 are indicated as $X'$ and $Y'$. To drill a hole at point A on the aligned workpiece 16 the machine programmers 106 and 122 will again have outputs proportional to $x$ and $y$ respectively. The point $A'$ is the point on workpiece 132 which corresponds to point A on workpiece 16, but tool 15 would drill a hole in the workpiece 132 at a point with the coordinates $x$ and $y$ (point A) unless the misalignment is compensated for. This programmed location is in error by an amount $\Delta Y$ along the Y axis, and $\Delta X$ along the X axis.

The error $\Delta X$ is a function of the Y axis position of point A, and the error $\Delta Y$ is a function of the X axis position of the point A. I compensate for the misalignment of the workpiece 132 along the Y axis by rotating template 24 until it makes an angle $\phi$ with the X axis. With the arrangement of FIGURE 1 template 24 should be rotated in the sense opposite to that through which the workpiece was misaligned. Since the workpiece is misaligned in counterclockwise direction template 24 should be rotated in a clockwise direction. I compensate for the workpiece misalignment along the X axis by rotating template 26 so it is parallel to the Y axis. With the template so adjusted, the follower 46 will apply the proper compensating signal to differential 58 to correct for the error $\Delta Y$, and the follower 48 will apply the proper compensating signal to differential 68 to correct for the error $\Delta X$.

The effect of these compensating signals can be explained with reference to FIGURE 4. To drill a hole in workpiece 132 at point $A'$, tool 15 must be positioned at $x'$, $y'$, the X–Y axis coordinates of point $A'$. The coordinates of point $A'$ on the $X'$–$Y'$ axis are denominated $a$ and $b$ respectively which are equal to the coordinates $x$ and $y$ on the X–Y axis.

The X–Y axis coordinates $x'$ and $y'$ of point $A'$ in terms of the $X'$–$Y'$ axis coordinates $a$ and $b$ are:

$$x' = a \cos \phi - b \sin \phi \qquad (1)$$

$$y' = a \sin \phi + b \cos \phi \qquad (2)$$

The expansion of $\sin \phi$ and $\cos \phi$ is:

$$\sin \phi = \phi - \frac{\phi^3}{3!} + \frac{\phi^5}{5!} - \frac{\phi^7}{7!}$$

and $$\cos \phi = 1 - \frac{\phi^2}{2!} + \frac{\phi^4}{4!} - \frac{\phi^6}{6!}$$

Here it should be noted that, as a practical matter, $\phi$ will be a very small angle, say for example on the order of 0.02 radian. Therefore any second order term in $\phi$ can be neglected without any appreciable error, so that the expansion of $\phi$ for my purposes is:

$$\sin \phi = \phi$$

$$\cos \phi = 1$$

Equations 1 and 2 can then be written:

$$x' = a - b\phi \qquad (3)$$

$$y' = a\phi + b \qquad (4)$$

Templates 24 and 26 do not compensate for the misalignment of a workpiece 132 as a function of the $X'$–$Y'$ coordinates $a$ and $b$ of point $A'$ but rather as a function of the X–Y coordinates $x'$ and $y'$. However, this does not introduce an error, because:

$$b = y' - a\phi \qquad (5)$$

$$a = x' + b\phi \qquad (6)$$

Substituting Equation 5 in 3, and 6 in 4:

$$x'=a-(y'-a\phi)\phi$$
$$x'=a+a\phi^2-y'\phi$$

Neglecting second order terms in $\phi$:

$$x'=a-y'\phi \tag{7a}$$

and for the Y axis:

$$y'=(x'+b\phi)\phi+b$$
$$y'=x'\phi+b\phi^2+b$$

Again neglecting second order terms in $\phi$:

$$y'=b+x'\phi \tag{8a}$$

Since $x=a$ and $y=b$, Equations 7a and 8a may be rewritten as:

$$x'=x-y'\phi$$

or $$x=x'+y'\phi \tag{7b}$$

and $$y'=y+x'\phi$$

or $$y=y'-x'\phi \tag{8b}$$

Template 26 is parallel to the Y' axis so that when carriage 19 is at $y'$ follower 48 has moved perpendicularly to the Y axis a distance equal to $y'\phi$. Since this movement (to the left in FIGURE 1) causes additive rotation of shaft 82, the output of the X axis transducer 102 is increased a corresponding amount for any position of carriage 19 along the X axis. When the carriage is at $x'$ the output is $x'+y'\phi$ which, as can be seen from Equation 7b, equals the output ($x$) of programmer 106 and the carriage 19 is thus correctly positioned along the X axis when motor 112 stops.

The compensation is similarly applied to the Y axis. When carriage 19 is at $x'$ follower 46 has moved perpendicularly to the X axis through a distance $x'\phi$. Since this movement (downward in FIGURE 1) causes subtractive rotation of shaft 62, the output of transducer 96 is decreased by $x'\phi$ for any position of the carriage 19 along the Y axis. When the carriage is at $y'$ the output is thus $y'+x'\phi$ which, as can be seen from Equation 8b, equals the output ($y$) of programmer 122. The carriage 19 is thus correctly positioned along the Y axis when motor 126 stops.

It should be noted that algebraic signs opposite from those in FIGURE 1 can readily be established if desired, by merely reversing the rotation of one or more shafts. It will also be appreciated that the templates need not necessarily be cut to match the ways. Sometimes it will be more convenient to pattern them after the mirror image of the ways. For example, where the ways 18 sag downwardly in FIGURE 1, template 24 may rise, and where the ways rise in FIGURE 1, the template may sag. The only effect of such a modification would be a reversal of sign for movement of follower 46.

In the interest of simplicity I have explained my invention thus far on the basis of a 1:1 ratio between the deviation of the ways and the corresponding template pattern, and a 1:1 ratio between the workpiece misalignment angle and the angle through which I rotate the templates. However, as will be apparent to those persons skilled in the art, if the templates move their respective followers through a distance which is any certain function of the deviation of the ways or the workpiece misalignment or both, I can generate a compensating signal to correctly position the machine tool. For example, I can advantageously use a ratio such as 1:10 or 1:100 in patterning the templates after their respective ways. Using a 1:10 proportionality factor, if ΔY in FIGURE 1 is 1/100 of an inch, I cut template 24 one-tenth of an inch at the corresponding point. An amplifying ratio such as this makes it easier to pattern the templates, and to compensate for very small deviations in the ways caused by slight but objectionable wear. Similarly, I can adjust the markings on the dials of screws 32 and 38 to introduce a suitable proportionality factor into the angular adjustment of the templates.

Of course, I take into account the proportionality factors of the templates in designing the remainder of my compensating system. For example, I can multiply the respective tool motion inputs to the differential gears 68 and 58 by the same proportionality factors as the templates by means of gears 72 and 92 respectively, and adjust the input-output ratios of the respective transducers 102 and 96 accordingly.

Further, it will be understood by those skilled in the art that my invention can be employed with any machine tool such as those having manually actuated members. In many such machines the operator positions the tool over a workpiece with the assistance of a dial that indicates the position of the tool relative to the machine way. In such machines, dials would be used instead of transducers 96 and 102 and the operator would function as a programmer and comparator. He would compare the dial reading with a value which is supposed to correspond to a given position on a workpiece.

FIGURE 3 is an elevation of the machine shown in FIGURE 1, and illustrates the Z axis error introduced by deflection of beam 22. The sag in the beam 22 under the moving load of the carriage 19 causes drill 15 to bore too deeply and I compensate for this Z axis error the same way I compensated for errors along the X and Y axes. I provide a template 132 along the Y axis. I pattern the surface of this template after beam 22. Follower 134 moves along the template surface as carriage 19 moves back and forth on beam 22. That component of follower movement which is perpendicular to the Y axis is coupled to one input side of a Z axis differential 136 by rack 138, gear 142 and shaft 143. The other input to the Z axis differential 136 is the Z axis movement of tool 15 and is coupled to the other input side of the differential by rack 144, gear 146 and shaft 148. The differential output shaft 152 drives the Z axis transducer 154. This differential output is the algebraic difference between the perpendicular component of the follower motion and tool motion along the Z axis. If the beam is deflected as shown in FIGURE 3, the output of the transducer 154 is increased by a corresponding amount for any Z axis position of the tool 15.

Figure 5:
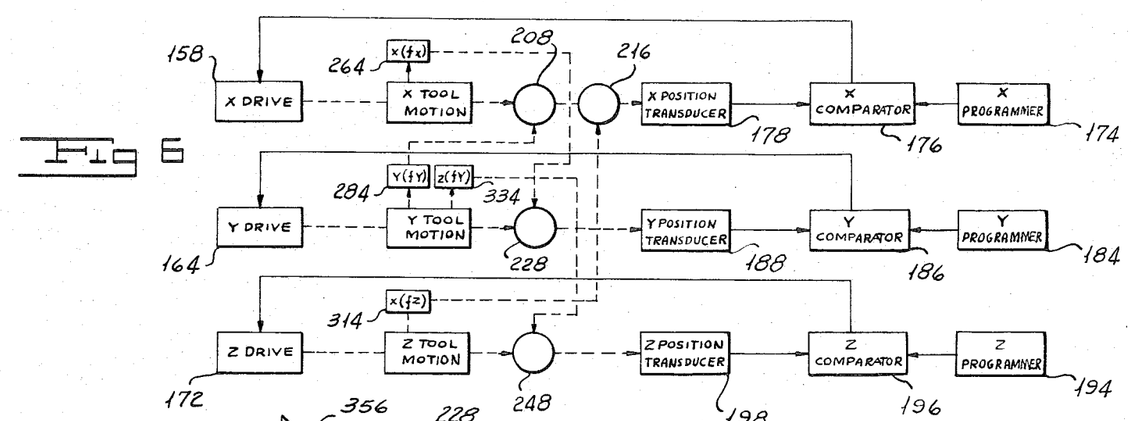
FIGURE 5 is a perspective view of a 3-axis machine tool showing one embodiment of my invention.
Figure 6:
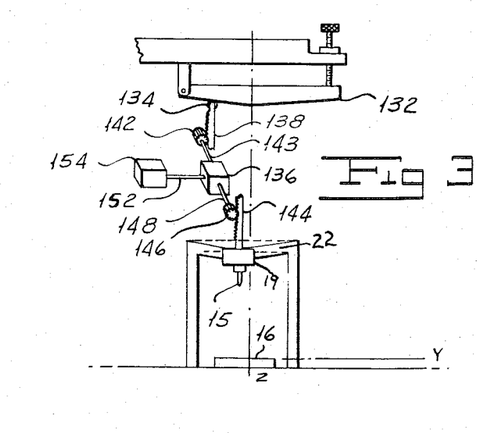
FIGURE 6 is a block diagram of the control system of the machine shown in FIGURE 5.

FIGURES 5 and 6 show the application of my error compensator to a three-axis machine tool.

The machine has rails or ways 152 along the X-axis. Uprights 156 carry a crossbeam 155, and a servomotor 158 housed in upstanding member 156 propels the beam 155 along the ways 152. Beam 155 carries a carriage 162 which is propelled along a way 166 by a servomotor 164 carried by the carriage 162. A servomotor 172, housed in carriage 162, moves a tool 168 up and down along the Z axis.

The position control of the machine tool illustrated in FIGURES 5 and 6 is the same as that described for FIGURES 1 and 2. Namely, the X axis has a programmer 174 which is coupled to a comparator 176. An output from comparator 176 causes the motor 158 to drive the upstanding members 156 along rails 152 until the output from programmer 174 is balanced by an output from transducer 178.

The Y and Z axes controls are comprised of like components which perform similar functions. For the Y axis I provide a programmer 184 coupled to a comparator 186. An output from comparator 186 causes motor 164 to drive the tool housing 162 along rail 166 until the output of programmer 184 is balanced by the output from transducer 188. For the Z axis I provide a programmer 194 coupled to a comparator 196. An output from comparator 196 causes motor 172 to drive tool 168 up or down in housing 162 until the programmer output is balanced by an output from transducer 198. As pointed out above in connection with FIGURES 1 and 2, the transducer for each axis has an output that is a function of the carriage or tool position along the respective axes. For the X axis I provide a rack 202 which engages a gear or pinion 204, that is moved along the rack 202 by a rod 206 attached to upstanding member 156. Gear 204 drives one side of a differential gear 208 through shaft 212. The output shaft 214 of differential 208 drives one side of a second differential gear 216, and the output shaft 218 of differential 216 drives the transducer 178. For the Y axis I provide a rack 222, that engages a gear 224, which is moved along rack 222 by a rod 226 attached to tool housing 162. Through shaft 232, gear 224 drives one side of a differential 228, the output shaft 234 of which drives transducer 188. For the Z axis I provide a rack 242, which engages a gear 244, which is moved along rack 242 by rod 246 that is attached to the tool 168. Gear 244, through shaft 252, drives one side of a differential 248, the output shaft 254 of which drives the transducer 198. It will be noted that the machine thus far described in connection with FIGURES 5 and 6 is typical of three-axis machine tools known to the art.

I compensate for misalignment of the machine ways shown in FIGURES 5 and 6 or misalignment of the workpiece 262 or both with apparatus which is based on the principles explained in connection with FIGURE 1 and 2. That is, I compensate for errors by changing the position of the tool 168 or carriage 162 from its programmed position along one axis by an amount proportional to the deviation of the ways or the workpiece or both from another perpendicular axis. More specifically, to compensate for misalignment or wear of the ways 152 I provide a template 264 along the X axis. This template is patterned after the projection of the ways 152 in the X–Y plane of the machine. I pivotally mount the template 264 on a pin 266, and provide an adjusting screw 268 which permits me to compensate for a misaligned workpiece. Errors in the machine ways or workpiece alignment along the X axis that are in the X–Y plane are compensated for by changing the Y axis position of the carriage 162 from its programmed position, as explained in connection with FIGURES 1 and 2. To change the carriage position along the Y axis, I provide a follower 272 which carries a rack 274 that engages a gear 276 which is constrained to remain in engagement with rack 274 by any appropriate means known to the art. A shaft 278 connects gear 276 to the other side of the differential 228. Follower 272 is moved along the Y axis by a rod 282 which is connected to the upstanding member 156. Gear 276 is slidably mounted on shaft 278 and is keyed thereto, permitting Y axis movement of shaft 278. The movement of follower 272 perpendicular to the X axis increases or decreases the number of revolutions of the output shaft 234 of differential 228 for a given Y axis. The output of transducer 188 is correspondingly increased or decreased for a given Y axis position of the carriage. As previously explained in connection with FIGURES 1 and 2, since the transducer output for a given carriage position changes, the carriage position which causes transducer 188 to produce an output which will balance a given programmer input also changes. The motor 164 drives the carriage to a new balancing position, at which the carriage is correctly positioned along the Y axis relative to the workpiece 262.

I provide a template 284 which is patterned after the projection of the track 166 in the X–Y plane to compensate for misalignment or displacement of track 166 in this plane. The template 284 is pivotally mounted on a pin 286, and can be adjusted for workpiece misalignment by means of screw 288. Errors along the Y axis are compensated for by changing the X axis position of the tool 168 from its programmed position. I do this with apparatus that comprises a follower 292 connected to a rack 294 which engages a gear 296, which is constrained by any appropriate means to remain in engagement with rack 294. Gear 296 is coupled to the other side of differential gear 208 by means of shafts 298 and 302 and bevel gears 304 and 305. The gear 296 is slidably mounted on shaft 293 and keyed thereto, permitting Y axis movement of gear 296. The bevel gear 305 is slidably mounted on shaft 302 and keyed thereto, permitting X axis movement of shaft 302. A rod 308 attached to tool housing 162 moves follower 292 along the template 284. The perpendicular component of follower movement increases or decreases the number of revolutions of the output shaft 214 of differential 208 for any position af the tool 168 along the X axis to compensate for errors in the X–Y plane.

For purposes of illustration, I have assumed that the machine illustrated in FIGURES 5 and 6 is also misaligned in the X–Z plane. Such a misalignment could occur if the tool 168 were bent for example. I provide a template 314 which is patterned after the projection of the tool 168 in the X–Z plane to compensate for this misalignment. The template 314 is not angularly adjustable since it is unlikely that a workpiece such as that shown at 262 would be misaligned in the X–Z plane. It is to be understood this template 314 may be made angularly adjustable if desired. I compensate for deviations of the tool 168 from the Z axis in the X–Z plane by altering the position of the tool 168 along the X axis, and for this purpose I provide a follower 316 which carries a rack 318 that engages a gear 322, which is constrained to remain in engagement with rack 318. Gear 322 is slidably mounted on a shaft 324 and keyed thereto, permitting Z axis motion of the follower and gear. Shaft 324 drives the other side of the differential 216. A rod 326 which is attached to tool 168 moves follower 316 along the template 314 as the tool 168 moves up and down along the Z axis. The component of the follower motion which is perpendicular to the Z axis increases or decreases the number of revolutions of the output shaft 218 of differential 216 a corresponding amount to compensate for the Z axis misalignment of tool 168.

The output shaft 214 of differential 208 drives one side of differential 216 and the output shaft 218 drives transducer 178. The output of transducer is thus increased or decreased by an amount which is a function of both the error in the Y axis ways and the misalignment of tool 168. Since the transducer output changes, the carriage position at which transducer 178 produces an output which balances the programmer input also changes. The motor 158 drives the carriage to a new balancing position, at which the carriage is correctly positioned along the X axis relative to the workpiece 262.

It should be noted that, if necessary, errors in the Y axis position of the carriage can also be compensated for as a function of Z axis tool position as well as X axis carriage position. The tool position along the Z axis could be compensated for errors in the ways along both the X and Y axes if necessary. This is accomplished by compensating for alignment errors along two axes which affect the tool position along the remaining axis in a manner similar to that which I have shown for the X axis as will readily be understood by those skilled in the art. However, usually the significant errors along one axis will be caused by misalignment along only one other axis.

I provide a template 334 to compensate for deflection of the beam 155. I pattern template 334 after the projection of beam 155 and the Y–Z plane. The template 334 is not angularly adjustable, since it is unlikely that the workpiece would be misaligned along the Z axis. However, where the possibility of workpiece misalignment exists, template 334 can be made adjustable as shown in respect of template 264. I use the template 334 to change the Z axis position of the tool 189 from its programmed position, and to make the required change in position I provide a follower 336 which carries a rack 338 which engages a gear 342. Gear 342 is constrained to remain in engagement with rack 338 and drives a bevel gear 344 by means of a shaft 346. Bevel gear 344 engages a gear 348, and gear 348 drives the other side of differential 248 by means of a shaft 356. Bevel gear 344 is slidably mounted on shaft 346, and keyed thereto permitting Z axis movement of shaft 346. Rod 354 moves follower 336 along template 334 as tool 168 moves along the Y axis. The component of follower movement perpendicular to the Y axis increases or decreases the number of revolutions of the output shaft 218 of the differential 216 a proportional amount to compensate for the deflection of beam 155.

Figure 7:
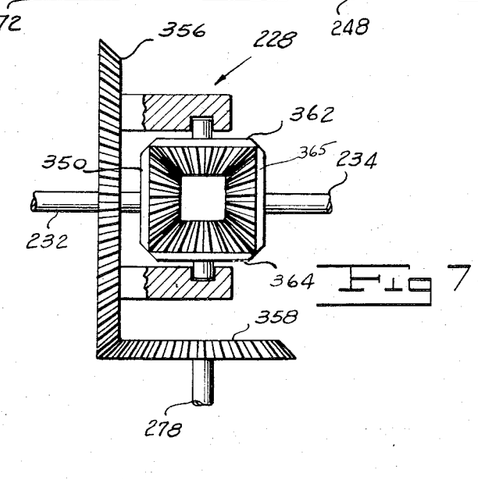
FIGURE 7 is a partial sectional detail view of a differential gear which can be used to practice my invention, showing inputs and outputs.

FIGURE 7 is a detailed view of the Y axis differential 228 which is typical of the differential gears I employ to practice my invention. One input side of differential 228 comprises a bevel gear 350 which is driven by shaft 232. The other input side comprises a pair of bevel gears 362 and 364 which engage gear 350. Gears 362 and 364 are rotatably carried by an external gear 356 which is rotatably mounted on shaft 232. Shaft 278 drives a gear 358 which in turn drives gear 356. The output shaft 234 is driven by a gear 365 which engages gears 362 and 364. Thus the number of revolutions of output shaft 234 is a function of the number of revolutions of both shaft 232 and shaft 278.

In operation my invention corrects errors in the position of the machine carriage or tool along one axis as a function of its position along another axis. I pattern a template after each misaligned way. If there is a possibility of workpiece misalignment along a given way I make that template angularly adjustable. The workpiece is then aligned as well as practicable in the machine and clamped in place. I make measurements to see if the workpiece is misaligned. If it is, I adjust the appropriate templates through an angle proportional to the misalignment angle. As the machine carriage moves toward the programmed position on the workpiece, the followers moving along their respective templates generate an output which is a function of the error that is causes by those ways to the position along another axis. I use these follower outputs to increase or decrease the distance the carriage is driven along ways and change their position from the programmed position so that the carriage and tool are correctly located with respect to the workpiece when the drive motors stop.

Thus it can be seen that the objects of my invention have been accomplished. My invention is a simple and inexpensive solution to a difficult and heretofore costly problem. My invention can correct for misalignment of the machine way or workpiece misalignment or both. It is easier to position a workpiece in a machine which employs my invention. My invention does not alter the machine program, and my invention can be installed with a machine which has been in service.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. An error compensator for a multiple axis machine comprising in combination a positioned member, a plurality of machine ways corresponding to respective multiple axes, means positioning said member along said ways, means producing an output which is a function of the position of said member along a first way, an angularly adjustable template, said template patterned after a second way and extending in its direction, a follower, means for moving said follower along said template as said member moves along said second way, means responsive to said output and to the component of movement of said follower which is perpendicular to the axis along which said template extends for controlling the position of said member along said first way.

2. An error compensator for a multiple axis machine comprising in combination a positioned member, a plurality of machine ways corresponding to respective axes, means for positioning said member along said ways, means for producing a first output which is a function of the position of said member along a first way, means for producing a second output which is a function of the position of said member along a second way, first adjustable means patterned after said first way and extending in its direction, second adjustable means patterned after said second way and extending in its direction, a sensor responsive to the pattern of said first adjustable means for producing a third output, a sensor responsive to the pattern of said second adjustable means for producing a fourth output, means responsive to said first output and said fourth output for controlling the position of said member along said first way, and means responsive to said second output and said third output for controlling the position of said member along said second way.

3. An error compensator for a multiple axis machine comprising in combination a positioned member, a plurality of machine ways, one of said multiple axes corresponding to each of said ways, means positioning said member along said ways, means for producing an output which is a function of the position of said member along one of said ways, adjustable means patterned after another of said ways and extending in its direction, pattern sensing means, said pattern sensing means adapted to move along said pattern as said positioned member moves along said other way, said pattern sensing means having an output which is a function of the deviation of said other way from the axis corresponding to said other way, means responsive to said pattern sensing means and said position output means for controlling the position of said member along said one way.

4. An error compensator for a multiple axis machine comprising in combination a positioned member adapted to be positioned at a predetermined location with respect to a workpiece aligned with the machine axes, a plurality of machine ways corresponding to and extending in the direction of respective multiple axes, means positioning said member along said ways, means for producing an output which is a function of the position of said member along a first way, an angularly adjustable template patterned after a second way and extending therealong, a follower adapted to move along said template, means including said follower for producing an output which is a function of the deviation of said workpiece from alignment with the machine axis which extends in the direction of said second way, and means responsive to both said outputs for controlling the position of said member along said first way.

5. An error compensator for a multiple axis machine comprising in combination a positioned member adapted to be positioned at a predetermined location with respect to a workpiece aligned with the machine axes, a plurality of machine ways corresponding to and extending in the direction of respective multiple axes, means for positioning said member along said ways, means for producing an output which is a function of the position of said member along a first one of said ways, a template, a follower, means for moving such follower along said template, said follower including means for producing an output which is a function of the deviation from alignment of said workpiece with the machine axis which extends in the direction of a second of said ways and means responsive to both said output producing means for controlling the position of said member along said first way.

6. An error compensator for a multiple axis machine comprising in combination a positioned member adapted to be positioned at a predetermined location with respect to a workpiece aligned with the machine axes, a plurality of machine ways corresponding to and extending in the direction of respective multiple axes, means for positioning said member along said ways, means for producing an output which is a function of the position of said member along one of said ways, adjustable means including means for producing an output which is a function of the deviation from alignment of said workpiece with the machine axis which extends in the direction of a second one of said ways, and means responsive to both said output producing means for controlling the position of said member along said one way.

7. An error compensator for a multiple axis machine comprising in combination a positioned member adapted to be positioned at a predetermined location with respect to a workpiece aligned with the machine axes, a plurality of machine ways corresponding to said axes, means positioning said member along said ways, means having an output which is a function of the position of said member along one of said ways, angularly adjustable means patterned after another of said ways, pattern sensing means, said pattern sensing means having an output which is a function of the deviation of said workpiece from the machine axis which extends in the direction of said other way, and means responsive to said pattern sensing means and said position output means for controlling the position of said member along said one axis.

8. An error compensator for a multiple axis machine comprising in combination a positioned member adapted to be positioned at a predetermined location with respect to a workpiece aligned with the machine axes, a plurality of machine ways corresponding to and extending in the direction of said axes, means positioning said member along said ways, means for producing an output which is a function of the position of the said member along a first one of said ways, means patterned after a second one of said ways, pattern sensing means, said pattern sensing means including means for producing an output which is a function of the deviation of said workpiece from the machine axis which extends in the direction of said second way, and means responsive to both said output producing means for controlling the position of said member along said first way.

9. An error compensator for a multiple axis machine comprising in combination a positioned member, a plurality of machine ways corresponding to said axes, means positioning said member along said ways, means having an output which is a function of the position of said member along one of said ways, means patterned after another of said ways, pattern sensing means, said pattern sensing means having an output which is a function of the deviation of said ways from the axis corresponding to said other way, means responsive to said pattern sensing means and said position output means for controlling the position of said member along said one way.

10. An error compensator for a multiple axis machine comprising in combination, a positioned member, a plurality of machine ways, means for positioning said member at a predetermined location along said ways, respective multiple axes corresponding to each of said respective ways, means having an output which is a function of the deviation of one of said ways from its corresponding axis at said predetermined location, means coupling said output means to said positioning means, said output changing the position of said member from said predetermined position along another of said ways.

11. An error compensator for a multiple axis machine comprising in combination a positioned member, a plurality of machine ways, means for positioning said member along said ways, means patterned after one of said ways, pattern sensing means for sensing the pattern of said patterned means, means responsive to the position of said machine along another of said ways, and control means responsive to said position responsive means and to said pattern sensing means for controlling said positioning means.

12. An error compensator for a multiple axis machine comprising in combination a positioned member, a plurality of machine ways, one angularly adjustable means patterned after one of said ways, another angularly adjustable means patterned after another of said ways, pattern sensing means associated with each of said patterned means, means responsive to the sensor associated with said means patterned after said one way changing the position of said member along said other way, and means responsive to the sensor associated with said means patterned after said other way changing the position of said machine along said one way.

13. An error compensator for a multiple axis machine comprising in combination a positioned member, a plurality of machine ways, angularly adjustable means patterned after one of said ways, pattern sensing means, and means responsive to said pattern sensing means changing the position of said member along another of said ways.

14. An error compensator for a multiple axis machine comprising in combination a positioned member adapted to be positioned at a predetermined location with respect to a workpiece having a nominal alignment with reference to the axes of said machine, a plurality of machine ways corresponding to respective multiple axes, means for positioning said member along said ways, means for producing an output which is a function of the position of said member along one of said ways, means for producing an output which is a function of the deviation from said nominal alignment of said workpiece with respect to the machine axis which extends in the direction of another of said ways, and means responsive to both said output producing means for controlling the position of said member along said one way.

15. An error compensator for a multiple axis machine comprising in combination a positioned member, a plurality of machine ways, means patterned after one of said ways, pattern sensing means, means responsive to said pattern sensing means for changing the position of said positioned member along another of said ways.

16. An error compensator for a multiple axis machine adapted to support a workpiece with a nominal alignment with respect to the axes of said machine comprising in combination a positioned member, and means responsive to the position of said member along one of said axes for compensating for misalignment of said workpiece with respect to said one axis, said means including means responsive to a change in the position of said member along another of said multiple axes.

17. In an error compensator for a multiple axis machine the combination comprising a machine way having predetermined surface irregularities along the length thereof and an angularly adjustable template patterned after said predetermined irregularities of said way and extending in the direction of said way.

18. In an error compensator for a multiple axis machine the combination comprising a machine way having predetermined surface irregularities along the length thereof and an angularly adjustable template patterned after said predetermined irregularities of said way.

19. In an error compensator for a multiple axis machine the combination comprising a machine way having predetermined surface irregularities along the length thereof and a template patterned after said predetermined irregularities of said way.

20. In an error compensator for a multiple axis machine the combination comprising a machine way having predetermined surface irregularities along the length thereof and adjustable means patterned after said predetermined irregularities of said way.

21. In an error compensator for a multiple axis machine the combination comprising a machine way having predetermined surface irregularities along the length thereof and means patterned after said predetermined irregularities of said way and extending in the direction of said way.

22. In an error compensator for a multiple axis machine the combination comprising a machine way having predetermined surface irregularities along the length thereof and means patterned after said predetermined irregularities of said way.

References Cited
UNITED STATES PATENTS

| | | | |
|---|---|---|---|
| 2,924,768 | 2/1960 | Farrand et al. | 77—3 |
| 2,937,325 | 5/1960 | Garber | 82—5 X |
| 3,039,032 | 6/1962 | Fowler | 82—5 X |
| 3,014,765 | 12/1961 | Mottu | 308—3 |

FRANCIS S. HUSAR, *Primary Examiner.*